United States Patent [19]

Aiello et al.

[11] Patent Number: 4,980,535
[45] Date of Patent: Dec. 25, 1990

[54] CONTROL ROD ABSORBER SECTION FABRICATION BY SQUARE TUBE CONFIGURATION AND DUAL LASER WELDING PROCESS

[75] Inventors: Louis L. Aiello, Castle Hayne, N.C.; James E. Charnley, Gilroy, Calif.; James A. Mees, Wilmington, N.C.; Robert C. Dixon, Morgan Hill, Calif.

[73] Assignee: General Electric Company, San Jose, Calif.

[21] Appl. No.: 475,570

[22] Filed: Feb. 6, 1990

Related U.S. Application Data

[62] Division of Ser. No. 250,631, Sep. 29, 1988, Pat. No. 4,925,620.

[51] Int. Cl.⁵ .................. B23K 26/00; G21C 21/18
[52] U.S. Cl. ................................................ 219/121.63
[58] Field of Search ............ 376/260, 327, 333, 463; 219/121.63, 121.64; 228/4.1, 47, 182–184

[56] References Cited

U.S. PATENT DOCUMENTS 3,407,117 10/1968 Lichtenberger .................. 376/333
4,354,090 10/1982 Nilsen .............................. 219/121.63
4,798,321 1/1989 Moran ................................ 228/183
4,840,303 6/1989 Fujii et al. ...................... 219/121.63

Primary Examiner—Harvey E. Behrend
Attorney, Agent, or Firm—Robert R. Schroeder

[57] ABSTRACT

An apparatus and process for the construction of a cruciformed section control rod is disclosed. The control rod is characterized by having square exterior sectioned tubes with central cylindrical volumes for the containment of neutron absorbing poisons. In the process, these tubes are welded together at the corners of the square sections to form the planar members of the cruciformed shaped rods. An apparatus and process is disclosed in which the rods are all held by a jig in the same configuration as is ultimately fabricated. Thereafter, the jig is drawn through fixtures, which fixtures accurately guide the rods to be joined by welding past paired and opposed laser welding heads. By the expedient of positioning the laser and rapidly drawing the braced together tubes by the laser, control rod fabrication occurs. There results a solid, integral control rod constituting a suitable pressure vessel for neutron absorbers for control of nuclear reactions.

3 Claims, 9 Drawing Sheets

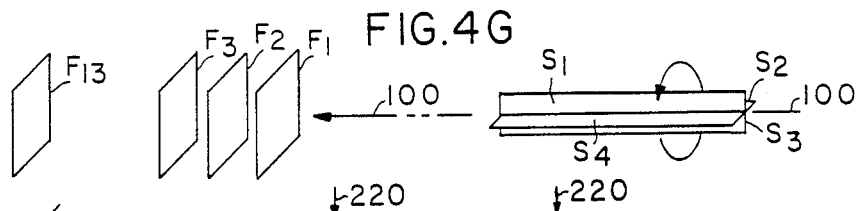
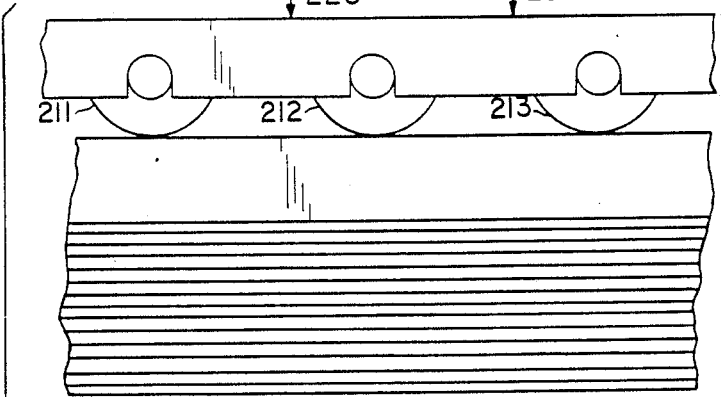
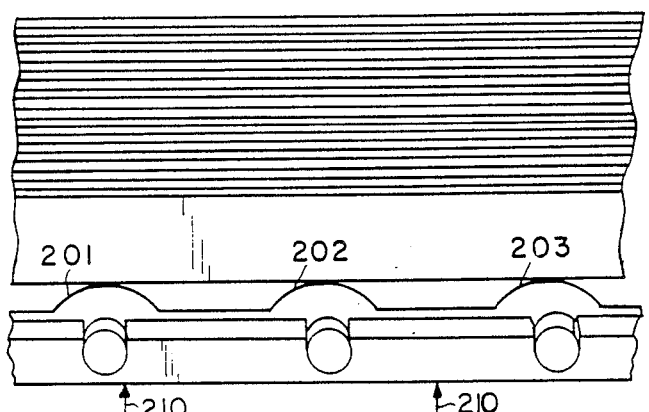
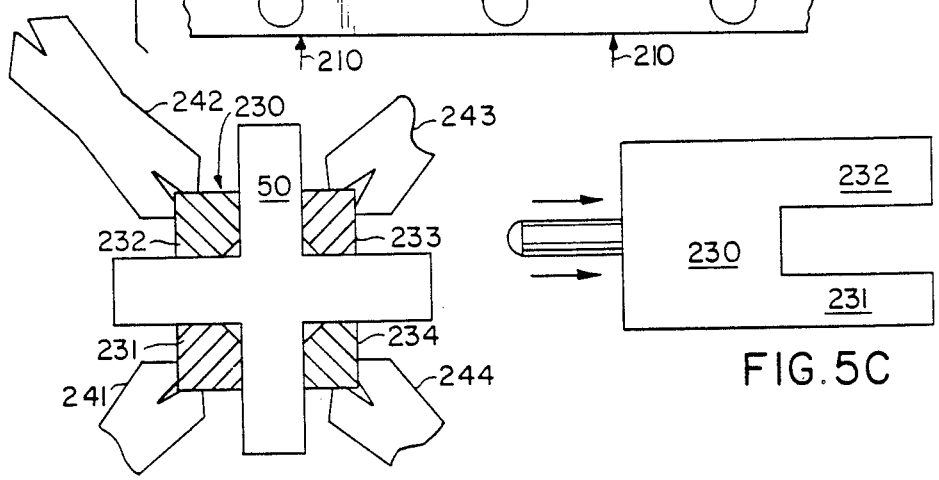
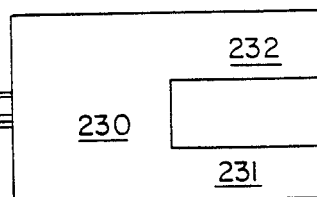

CONTROL ROD ABSORBER SECTION FABRICATION BY SQUARE TUBE CONFIGURATION AND DUAL LASER WELDING PROCESS

This is a division of application Ser. No. 07/250,631 filed Sep. 29, 1989, now U.S. Pat. No. 4,925,620.

BACKGROUND OF THE INVENTION

This invention relates to nuclear reactor control rods. More particularly, a process of fabrication and apparatus for fabricating a nuclear control rod is disclosed in which tubes having cylindrical neutron absorber containment volumes with square exterior sections are welded together to fabricate the resultant control rod construction.

SUMMARY OF THE PRIOR ART

Nuclear reactors have control rods containing poisons for neutron absorption and either shutting down or shaping their nuclear reactions. The control rod typically used in boiling water reactors (BWRs) are provided with a cruciformed shape and pass in the complementary cruciform shaped interstices between fuel channels. Control rods of the prior art are of two principal configurations.

In one configuration, control rods have included sealed, hollow tubes placed in side-by-side relation along the axis of the cruciform shaped control rods. The tubes extend vertically, are plugged at both ends, and contained a neutron absorbing material such as boron carbide on the inside. The rods themselves are in turn contained within a metallic sheath. This sheath completely surrounds the rods on the outside. The metallic sheath in cooperation with top and bottom support structures are fastened through a central tie rod to confine the rods in side-by-side relation. Typically both the top and bottom support structures and sheath impart to the side-by-side rods the required cruciform shape.

It is important to note in this prior art construction that the tubes containing and confining the neutron absorbing material do not contribute to the structural integrity of the control rod. Rather, separate and relatively heavy structural members including the central tie rod are required to hold the assembled control rod together.

In another prior art configuration, it has been known to provide a solid stainless steel member with drilled holes. This solid steel member has the length and width of the prior art sheath. This solid steel member has a plurality of accurately drilled holes extending horizontally from the side edges of the rod to and towards the center of the required cruciform shape. These holes are horizontally drilled with gun drills to define accurately aligned cylindrical volumes for the containment of neutron absorbing materials. Such control rods with horizontal holes can contain slightly higher volumes of neutron absorbing materials than the control rods containing tubes and sheaths.

All control rod designs have attempted to maximize neutron absorbing material volume, provide the required structural rigidity to the control rod, and to have a weight limit sufficient to permit required rapid movement by conventional control rod movement drives. Further, all control rods must provide containment for their nuclear poisons such as boron carbide, hafnium and other neutron absorbers to prevent loss of poison and contamination of the reactor. This containment must withstand external system pressure at the beginning of in service life and generated internal pressures from atomic decomposition at the end of in service life.

Regarding generated internal pressures from atomic decomposition, many of the nuclear reactor poisons undergo element change. For example, boron carbide when absorbing neutrons eventually generates helium. The helium accumulates at high pressures. Simultaneously, the boron carbide swells and sinters. The combination of the gas production and the sintering traps gasses in localized pockets under extremely high pressure.

Control rods utilized within a modern nuclear reactor are of two general types. First, control rods having the purpose of shutting down the reactor are typically designed to have relatively high neutron absorbing worth. These control rods are not designed to withstand high neutron fluence for long periods of time.

Secondly, control rods for control cell locations are designed for the purpose of controlling and shaping the neutron flux profile of the reactor. These latter control rods must have long in service life times with high neutron fluence.

Control rod design must include provision for both types of control rods.

SUMMARY OF RELATED DISCLOSURES NOT PRIOR ART

In U.S. patent application Ser. No. 07/031,633, filed Mar. 30, 1987, entitled Control Rod naming Dixon et al. as inventors, now U.S Pat. No. 4,902,470 issued 2/20/90, the control rod article which it is the purpose of the disclosure herein to fabricate is set forth. This control rod fabrication is illustrated in pertinent part in FIGS. 1 and 7 of the drawings herein.

Stated in summary format, the control rod comprises a series of side-by-side tubes. As is conventional, the tubes include a circular interior containment volume. As is unconventional, the tubes all have a square exterior section.

As is set forth in the previous disclosure, it is proposed to join the square sectioned tubes to form the flat planar neutron absorbing members of the control rod by laser welding. The tubes, thus joined, form a new economical control rod structure.

The advantages of this construction include the fact that the tubes are good pressure vessels for the neutron absorbing poisons used interior of control rod. Such pressure vessels contain over a 10% greater neutron absorbing poison containment than prior art structures. The overall tube construction has a lighter weight. Because of its strength, it can accommodate heavy neutron absorbers such as hafnium.

The tube construction allows poison containment to be tailored to the particular portion of the reactor into which the control rod is inserted. The relatively high strength to weight ratio of the design enables the control rod to contain itself against anticipated loadings such as those encountered during rapid control rod movement (SCRAM) or seismic loading.

The disclosed tubes have the advantage of being fabricated by standard tube making techniques. Unlike the prior art, surrounding sheaths are not required. Neither is accurate side-by-side "gun" drilling. There results from the construction accurately aligned vertical cylinders.

Each square sectioned tube defines its own neutron absorber container. Consequently, any leakage will be confined to a discrete tube. The welding together of the tubes forms a rigid planar construction. Because the weld utilizes the corner section, the weld in no way interferes with required tubular containment. Furthermore, the fabricated control rod has a wear resistant profile. In the preferred embodiment, the corner sections extend outwardly and are the first members to abut and wear.

All grooves and welds extend axially in the direction of control rod movement. The tendencies of the resultant control rods to hang up on obstacles are reduced. In short, a versatile type of control rod construction results which can accommodate both high worth and high fluence levels.

In patent application Ser. No. 183,558 filed 4/19/88 and entitled Nuclear Reactor Control Rod Encapsulated Neutron Absorbent naming Dixon et al. as inventors, an encapsulation of boron carbide placed within control rods has been proposed. Simply stated, the boron carbide is encapsulated within metal tubes before placement to the cylindrical opening in the square sectioned tubes. This encapsulation furnishes a subcompartmentalization which prevents the boron carbide from forming voids and therefore volumes of uneven neutron absorption along the lengths of the control rod.

It is the purpose of the following disclosure to cooperatively utilize the articles disclosed in these related disclosures in an apparatus for fabrication and a process of fabrication of the control rod.

SUMMARY OF THE INVENTION

An apparatus for constructing and a process of construction of a cruciform sectioned control rod is disclosed. The rod itself is characterized by individual tubes having a cylindrical interior and having a square exterior. The cylindrical volumes interior of the tubes contain segmented neutron absorbing poisons. The finished construction has the rods welded in side-by-side relation to form from the square sectioned tubes the flat planar neutron absorbing surfaces of the cruciform sectioned control rods.

In the process herein disclosed, the rods with their neutron absorbing poisons sealed therein are tapped at opposite ends in each end plug. The end plugs are in turn threaded. A cruciformed sectioned leading jig and a complementary cruciformed sectioned trailing jig are utilized. These leading and trailing jigs are provided with an array of complementary male threaded members. These male threaded members join to the complementary female tapped and threaded holes and together with the jigs hold all the rods together in the format of the ultimately constructed control rod. The leading jig and the trailing jig are fastened together by longitudinally extending rigid jig members.

The threaded members can accommodate differential contraction of the tubes. Specifically, the leading jig and its male threaded members are configured to maintain a constant distance between the leading edge of the square exterior sectioned tubes to be welded and the leading jig. The trailing jig and its threaded male members are configured to form a variable distance between the trailing jigs and the ends of the square sectioned tubes. During laser welding along the interfaces at the corners between the square exterior sectioned tubes, differential longitudinal contraction of the tubes can occur from the leading edge to the trailing edge.

The structure including the cruciformed sectioned jig and the square exterior sectioned rods is pulled through a series of preferably 13 fixtures. Each fixture includes opposed, paired vertical and horizontal rollers. These opposed, paired vertical and horizontal rollers trap the planar surfaces of the jigs and held square exterior sectioned tubes therebetween.

Each of the opposed rollers defines a central gap. The paired horizontally opposed rollers define a central vertical gap. The vertically opposed rollers define a central horizontal gap. These gaps in the rollers of the fixtures enable those planar sections of the control rod which are normal to either the horizontal or vertical opposed rollers to pass through the rollers.

Typically, 13 such fixtures are used so as to accurately reference the passage of the jigs and the rods to be welded. Between the seventh and eighth fixture there is placed on either side of the upward vertical portion of the control rod being fabricated, paired at laser welding heads. One laser welding head addresses the vertical surface of the jig braced square exterior sectioned tubes from one side. The other laser welding head addresses the vertical surface of the jig braced square exterior sectioned tubes from the opposite side. Preferably, the lasers are given an angle of incidence to the interface between the square sectioned rods at an angle of 5°. This angularity assures that the output energy of one laser cannot see the other laser in the event of both a gap and coincidence in elevation between the paired and essentially opposed laser heads on either side of the jig.

Each laser head is provided with a tracking member. This tracking member tracks the interface between the discrete corners of the square sectioned tube.

The laser head is first positioned with respect to a particular interface to be welded. Once positioning has occurred, the jig with braced rods is pulled through the fixtures. In such pulling, it passes the laser head. The laser head tracks the interface between the tubes. Thereafter, welding occurs.

A sequence of welding the jigged braced rods together is disclosed. Typically, cruciform sectioned segments (commonly referred to as "tie rod segments") are placed in the central portion of the control rod at spaced apart intervals. It will be recalled that in former control rod construction, the tie rods were structural members holding the control rod together in tension.

After such placement of the spacing tie rod segments, all of the tubes necessary to form an entire control rod are placed in this jig. The welding is performed in a particular sequence to minimize distortion.

The unwelded square exterior sectioned tubes are welded together in groups adjacent to but not joined to the central cruciform shaped tie rod segment. A tube of each group is simultaneously welded to an underlying tube on one side of a vertical surface and an overlying tube on the opposite side of an opposite vertical surface. Thereafter, and on the next pass, welding to an underlying tube on one side of a vertical is accompanied by welding to an overlying tube on the other side of the opposite vertical surface. The resultant sequence minimizes the effects of longitudinal shrinkage of the rod and most importantly prevents a longitudinal warpage of the rods.

Preferably, the rods of each planar section are welded together in groups of five, three and nine. Thereafter, the groups of five are fastened together to the central portion. Upon completion of the welding of the control rod groups, the end assemblies including the handle at one end of the control rod and the velocity limiter at the other end of the control rod are attached by welding which completes the control rod assembly procedure.

Other Objects, Features, and Advantages

An object of this invention is to disclose a jig for holding the square sectioned tubes in the assembled relation of the finished control rod and to permit among such held tubes the required differential contraction upon welding, especially in the longitudinal direction.

An advantage of the disclosed jig is that it permits all of the square sectioned tubes of a control rod to be placed in the jig at once. Once assembled on the jig, welding of all the rods can occur as an essentially continuous process. This process occurs without further unnecessary assembly steps, save and except in the attachment of the velocity limiter and handle.

An additional advantage of the disclosed jig is that it can accommodate longitudinal differential contraction between the braced square exterior sectioned tubes, especially in the longitudinal direction. Specifically, by maintaining a constant distance between the leading portion of the jig and the braced squared exterior sectioned tubes and permitting a variable distance between the trailing portion of the jig and the square exterior sectioned tubes, conformance between the rods during longitudinal welding can occur. This conformance minimizes any tendency of the welded tubes to longitudinally warp.

A further object of this invention is to disclose a series of fixtures through which the jig of this invention can be pulled and while being pulled can be braced for laser welding. Accordingly, fixtures having opposed vertical and opposed horizontal rollers are disclosed.

An advantage of the fixtures of opposed rollers in combination is that they provide a firm reference from which automated laser welding can occur. Such laser welding must be restricted to tolerances in the order of 1,000ths of an inch, these tolerances being required to form continuous welded seals. The combination of the fixtures with a tracking laser welding head enables a reliable continuous weld at the corners of the square exterior sectioned tubes.

A further object to this invention is to disclose cooperation between the jig and fixtures. Simply stated, the disclosed laser welding apparatus is preferably utilized to weld the vertically protruding top over one quarter portion of the cruciform sectioned control rod assembly time. This section can be readily changed by pulling the jig clear of the fixture assemblies, rotating the jig 90° with respect to such assemblies and reinserting the jig for passage through the fixtures. This process of jig rotation is easily accomplished many times during complete control rod welding.

Yet another object to this invention is to disclose a preferred orientation of the laser welding heads. According to this aspect of the invention, the laser welding heads are essentially opposed and directed towards one another. To avoid beam damage from one laser head to the other laser head, the heads are furnished with an angle of incidence that is inclined at 5°. In the event that material to be welded is essentially absent between the opposed beams, the 5° angle of incidence assures that the two lasers cannot damage one another with their beams.

BRIEF DESCRIPTION OF THE DRAWINGS

Other objects, features and advantages of this invention will become more apparent after referring to the following specification and attached drawings in which:

FIG. 4G is a schematic illustrating how the bracing assembly can be rotated when pulled clear of the jigs for working on the planar sections of the control rod;

FIG. 5A is a detail of the vertical section of the control rod, the detail illustrating the vertical compression of the square sectioned tubes being welded adjacent the weld heads by overlying and underlying vertical rollers;

FIG. 5B is a detail of a blocking assembly for fastening the cruciform segments of the control rod;

FIG. 5C is a side elevation of a fixture for holding the so-called "tie rod segment" in place during welding;

Referring to FIG. 1, an actual section of the composite control rod is illustrated. Applicants point out that while size is not normally construed to be indicative of invention, the construction of nuclear reactors renders size in this invention important.

The control rod herein can be fabricated to discrete sizes. By way of example, a square sectioned rod having 0.260 inch cross sectional dimension includes 0.204 inch inside diameter cylindrical volume. Alternately, a square sectioned rod having a 0.312 inch cross sectional dimension includes 0.250 inch inside diameter. Wall thickness of 0.021 inch and 0.024 inch are provided respectively. It will be seen with the aforementioned dimensions that the square section of the rod slightly exceeds the tube diameter. Other dimensions may as well be used.

It will be understood that in boiling water reactors, fuel bundles are contained within square sectioned channels. These channels are placed in side-by-side relation and form a cruciformed sectioned interstitial space therebetween. In BWR type reactors, control rods are inserted from the bottom of such reactors towards the top. In such insertion, they pass in a cruciform shaped interstices between the fuel bundles. Consequently, the control rods themselves are configured in a cruciformed shape.

Some further dimensions can be instructive. Typically, the control rods are 174 inches long. The length of fuel loading in a nuclear reactor can be in the range of 144 to 150 inches. Typically, the interstitial space between adjacent fuel channels is in the order of a half inch.

Mechanisms for moving the control rods are conventional and expensive to replace. Consequently, it is important that new control rods be of such size and such weight that no substantial alteration is required to the control rod drive, fuel, and core support hardware.

Typically, control rod drives precisely move the control rods (see FIG. 7) to positions of partial insertion for shaping the reactor "burn". Additionally, and for purposes of SCRAM, the control rods must move rapidly from any current position to full insertion within the reactor. In some types of reactors, the entire 12 foot length of the control rod must be capable of insertion into the interstices between fuel channels in the range of 1.6 seconds. Consequently, acceleration and deceleration forces are to be reckoned within the construction of the control rod. Moreover, the control rods must have sufficient rigidity to withstand anticipated seismic loadings.

Regarding seismic events, two conditions must be simultaneously considered in a design "worse case" scenario. First, and since the most significant component of seismic loading on a reactor is horizontal and dynamic, it can be anticipated that during a seismic event the individual fuel channels will have a bowed configuration. Second, and because of the seismic event, scraming of the reactor will be desired. Consequently, the control rods will have to be sufficiently flexible to penetrate the interstices of the fuel channels while having sufficient columnar strength to avoid buckling.

Having introduced the environment to which the invention resides, the rod construction itself may be rather simply understood.

Figure 1:
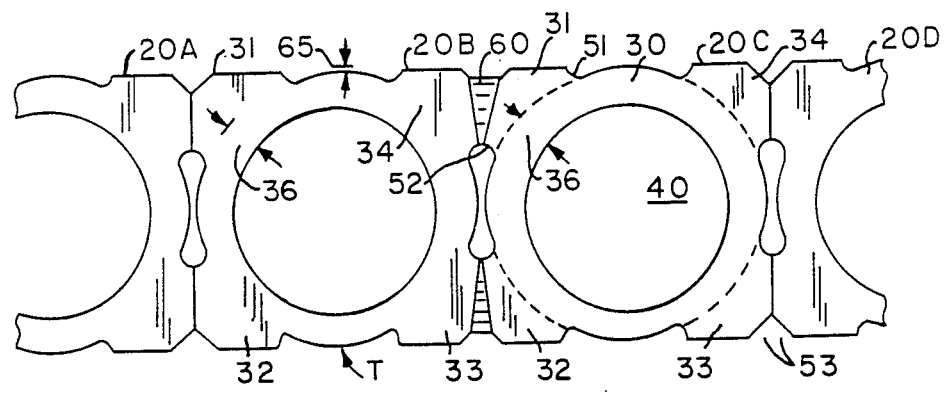
FIG. 1 is a side elevation section of a series of control rod tubes having cylindrical interiors and squared exteriors for use in fabricating the control rod of this disclosure.

Referring to FIG. 1, square sectioned tubular member 20A, 20B, 20C, and 20D are shown in side-by-side configuration. Taking the case of configuration 20C, the elemental construction of the square sectioned tubular member can be easily seen and understood.

Typically, each section includes a constant sectioned cylinder 30. Further, each tubular section includes four added corners. The added corners are corners 31, 32, 33, and 34.

A broken line has been drawn between each of the respective corner sections 31, 32, 33, and 34 and the constant sectioned cylinder 30. This broken line demonstrates that cylinder 30 has a constant side wall of thickness 36 that extends entirely around the defined cylindrical volume 40 of the control rod. This constant side wall thickness 36 provides the requisite containment and pressure resistant vessel required by the control rod construction.

Corner sections 31, 32, 33 and 34 serve at least two additional purposes.

First, the corner sections impart to the disclosed tube the required square exterior cross section. The tubes can thus be welded in side-by-side relation.

Second, the corner sections constitute wear points. Where contact occurs between the fuel channels and the sides of the control rods, the respective corner sections 31, 32, 33, and 34 will effect such contact first. The tubular member will not at all be affected or worn.

Further, and as will be hereinafter discussed, the thickness of the corner sections prevents the weld from interfering with the structural integrity of the tube required for containment of the hot pressurized neutron absorbing poisons.

It is known that in metallic pressure vessels that sharp surfaces are to be avoided. Accordingly, each of the corner sections is provided with fillets 51, 52. These respective fillets define a transition between the respective corner sections and the tubular sides. Likewise, the corners are chamfered and rounded at area 53. Thus, the corners are not sharp and are specified to conform to tube fabrication technology, including for example, drawing.

Referring to FIG. 1 and specifically at the corner 60 between rod 20B and 20C, the placement of welding metal is illustrated. It can be seen that the adjacent chamfered and rounded corners 53 between control rods 20B and 20C have defined a convenient interstitial area for the weld metal. The weld metal has penetrated in the shaded wedge shaped area illustrated at 60.

Regarding this shaded wedge shaped weld metal area, it will be seen that it penetrates the corner section only. It does not penetrate or interfere with the required tubular side wall 36 required around the cylindrical volume 40.

Further, it will be understood that there is produced a generally "V"-shaped groove between the respective tubular members 20B, 20C. This V-shaped groove is ideal for tracking by automated welding equipment. Thus the composite rod here set forth can be directly fabricated from automated welding techniques, preferably laser welding.

Figure 2:
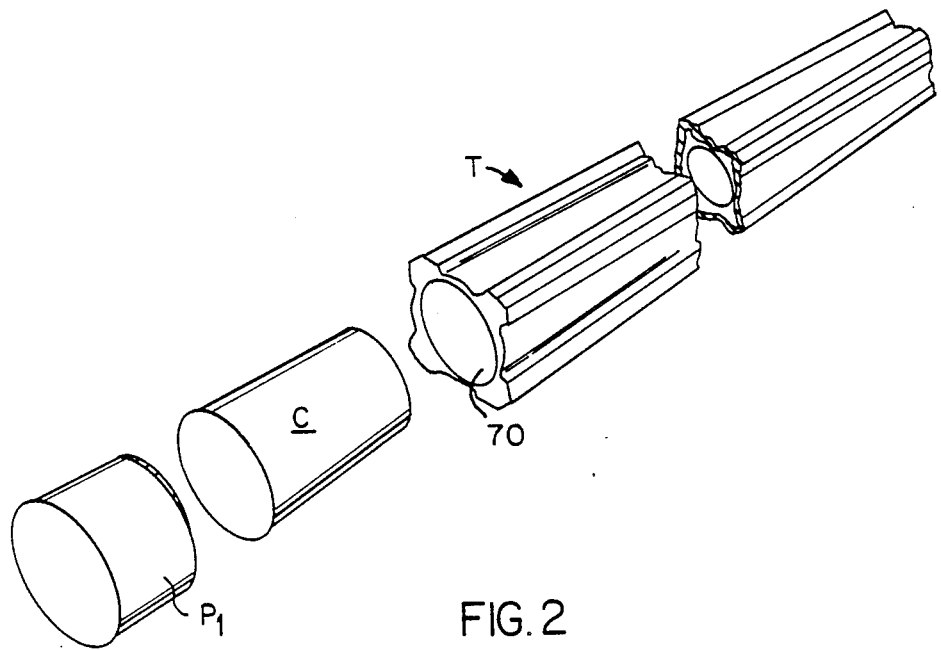
FIG. 2 is a perspective of a control rod tube the tube being loaded with a series of canisters, the canisters containing neutron absorbing poisons.

Referring briefly to FIG. 2, the loading and sealing of the square exterior section tubes can be understood. As is shown in FIG. 2, tube T is being loaded with canister C1. It will be understood that the tube T includes canisters C2 through Cn disposed along its length. Assuming a control rod of the length herein specified, approximately 12 canisters C1 through C12 can be utilized. Alternatively, it may be desirable to load a portion of the control rod with hafnium. In this case, hafnium cylinders are placed within the tubes. The length of hafnium cylinder can vary from less than the length of a canister to the full length of a tube.

Fitting of the respective end plugs P1, P2 can be easily understood. Specifically, and preferably the control tube of FIG. 2 is configured with a closely controlled inside diameter 70. Likewise, the plug P is configured with a closely controlled outside diameter 72. The respective diameters utilized are usually given a clearance in the order of 1 mil. Such a close clearance is required in order to accommodate the disclosed process of laser welding. This welding causes the tube ends to be sealed and is illustrated schematically with respect to FIG. 3.

Figure 3:
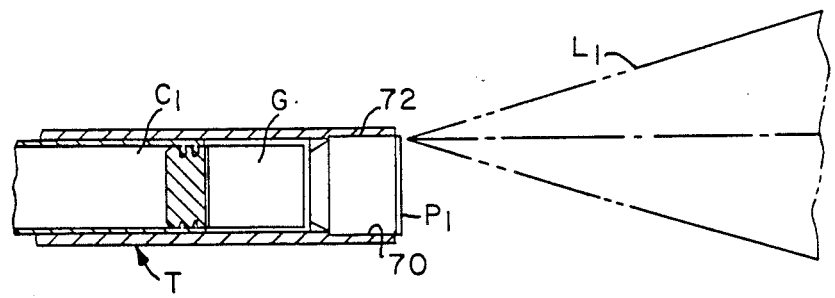
FIG. 3 is a schematic illustrating the sealing of the square sectioned tubes.

Referring briefly to FIG. 3, tube T is illustrated at the end adjacent canister C1. In the particular illustration here enclosed, a plenum chamber G is illustrated placed between plug P1 and the end of canister C1. This canister G assists in collecting the helium generated from boron carbide by exposure to radiation and is known in the art.

It can be seen that between the precision inside diameter 70 of tube T and the outside diameter 72 of plug P1, a laser beam L1 is effecting a laser weld.

A brief explanation can be made of the laser welding herein utilized. In the welds herein, inert gas shields and the like are preferably not used. Thus, it is the metal of the end plug and the metal of the tube which forms the weldment utilized in the weld.

Moreover, for the laser beam L1 to have its intended welding effect, the tolerance between inside diameter 70 of tube T and outside diameter 72 of plug P1 must meet precise limitations. Otherwise, the energy from the laser beam will pass interior of the tube and not form a weld.

It will be understood that at this juncture, a series of sealed tubes are fabricated. These series of tubes will be first mounted to a jig or bracing apparatus. Thereafter, and as mounted to the bracing apparatus, the tubes will be pulled through fixtures. When pulled through the fixtures, welding will occur.

Accordingly, and with reference to FIGS. 4B and 4C, the fixtures will first be described. The description in FIG. 4B will set forth the overall jig configuration. The description of FIG. 4C will illustrate how differential longitudinal contraction can be accommodated between the individual tubes T during welding. Thereafter, and with reference first to FIG. 4A and finally to FIG. 4D, drawing of the jig structure through aligned fixtures will be illustrated.

Figure 4A:
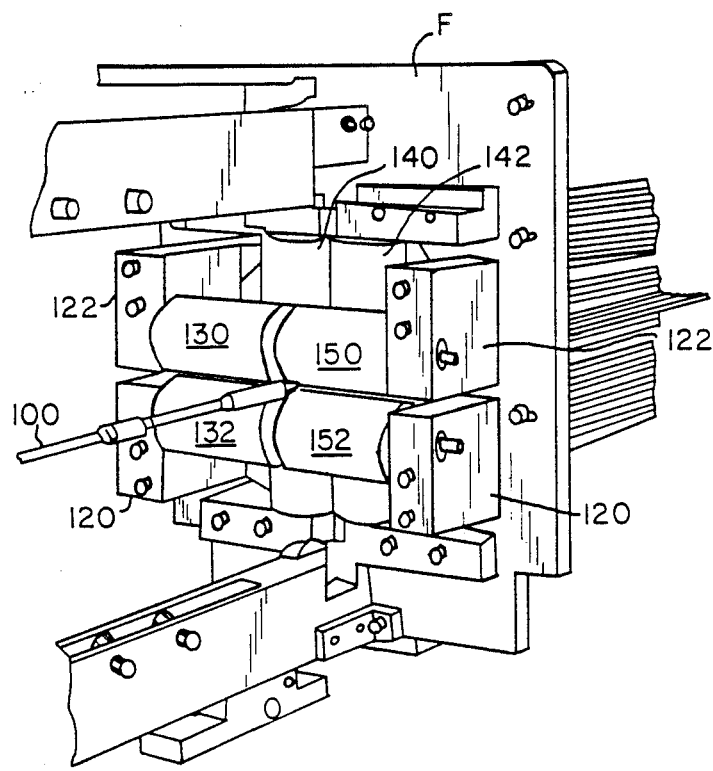
FIG. 4A is a side elevation perspective of a fixture utilized for guiding the control rod assembly of this invention past a laser welder.
Figure 4B:
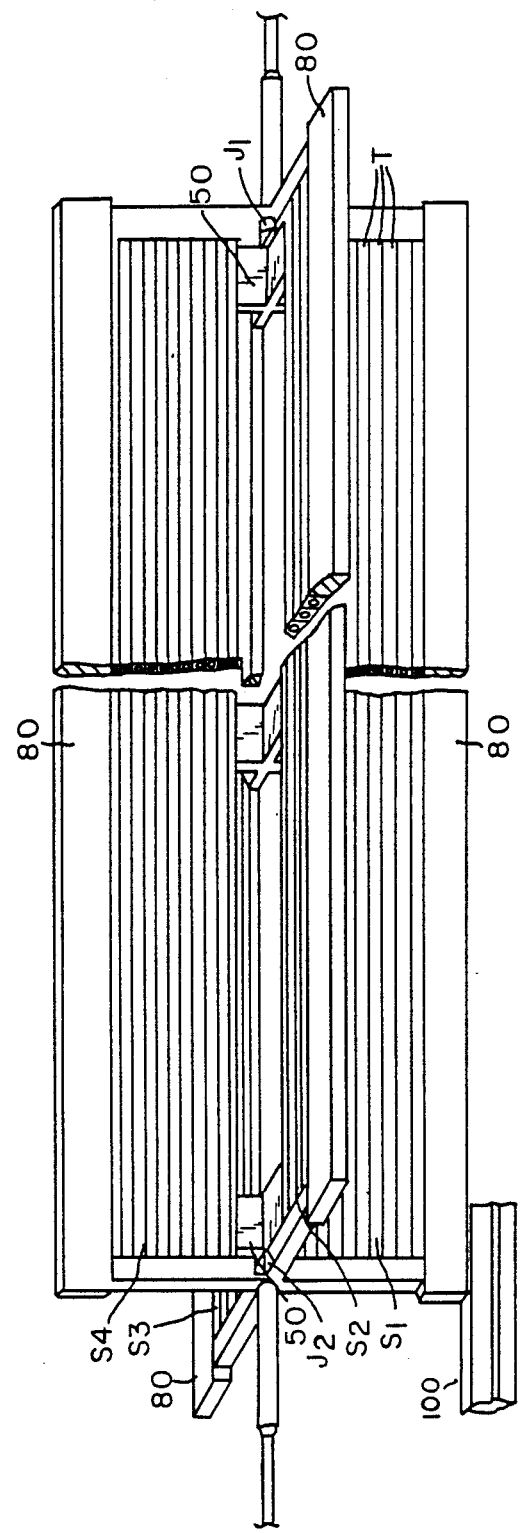
FIG. 4B is a perspective view of an entire control rod assembly for bracing all of the square sectioned tubes utilized in the fabrication of a control rod in their assembled relation.

Referring to FIG. 4B, the jig assembly of this invention is set forth. Specifically, a leading jig assembly J1 is illustrated, this assembly having the cross or cruciform shape. This cross or cruciform shape is in the ultimate cross sectional dimension of the finished control rod. Further, trailing assembly J2 is also illustrated. This assembly is complementary to assembly J1.

Between the respective jigs J1 and J2, sufficient square exterior sectioned tubes T are supported to form a complete control rod. That is to say, before welding begins, all tubes T are assembled between the jigs J1 and J2. Once they are mounted to the jig, welding can continue without disassembly of the jig apparatus illustrated.

As can be seen, sides S1, S2, S3 and S4 are supported between the jig members J1 and J2. Intermediate the jig members there are placed and braced cross members 50. These cross members 50 form the "tie rod segments".

It will be remembered that in former control rod constructions, the central portion of the rod was utilized as a tie rod acting in tension to hold the control rod. That is to say, it was an important structural member in tieing together the distal ends of the control rod assembly.

In the construction herein illustrated, the tubes T form the required structural members. Therefore, it is only necessary to have intermittent spacer members or "tie rod segments" placed along the length of the jig.

Figure 4C:
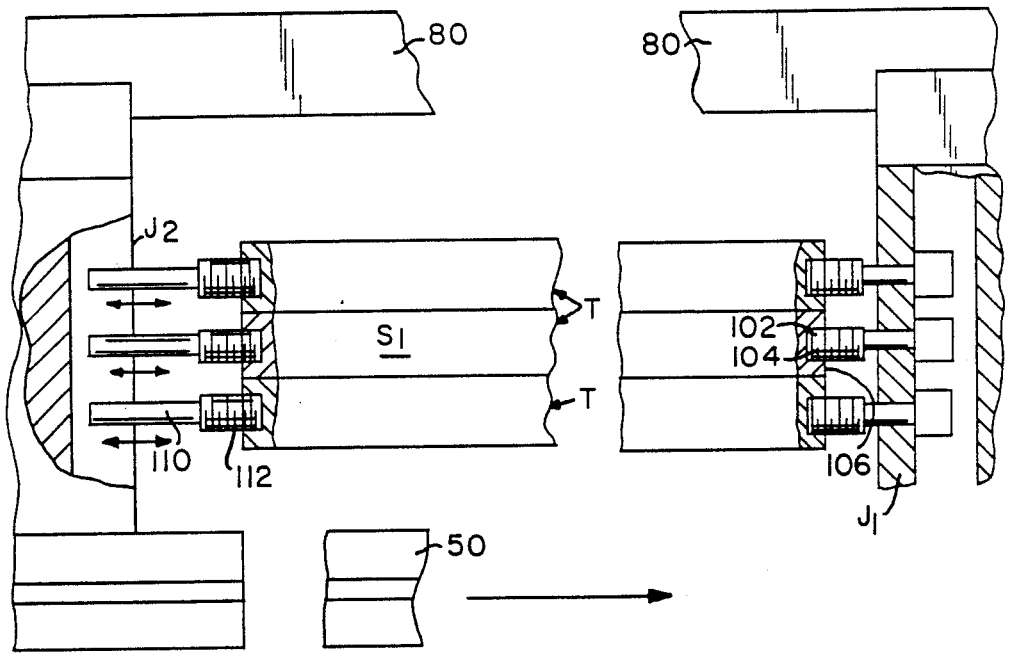
FIG. 4C is a schematic view of the bracing apparatus of FIG. 4B, the schematic illustrating how the bracing apparatus accommodates differential expansion longitudinally during the disclosed laser weld.
Figure 4F:
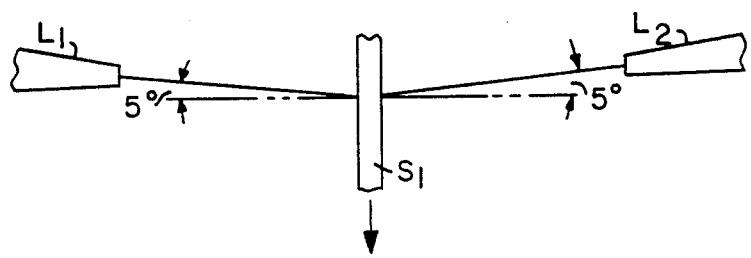
FIG. 4F is a schematic illustrating the angle of incidence of the laser welding beams on the passing rod section.

Referring to FIG. 4C, the actual support of the individual tubes T of a portion of side S1 is illustrated. Specifically, the end plugs are each tapped and threaded at a central aperture 102. These tapped and threaded holes are penetrated by a threaded lead member 104. Lead member 104 attaches to jig J1 so that the leading edge 106 of the square exterior sectioned tubes remains the same distance from jig J1 in the case of all tubes T.

The trailing edge of all the tube T is fastened differently.

Specifically, a member 110 is threaded to trailing jig member J2. A tapped and unthreaded aperture 112 supports the rod T1 to the trailing jig member J2. Thus, it can be seen that the end 114 of the tube T is free to move towards and away from jig member J2. As the jig member J2 is held by the stiffener bars 80, it will be seen that if longitudinal shrinkage occurs, such longitudinal shrinkage will allow the individual tubes T to move towards and away from the trailing jig member J2.

Having set forth the jig member, the fixtures F through which the jig members are pulled may be set forth. Referring to FIG. 4A, a typical fixture member F is disclosed.

Fixture members F include a central plate structure 120. Plate structure supports suitable roller end stanchions 122. The fixture includes paired and opposed horizontal rollers 130, 132. Likewise, the fixture includes paired opposed vertical rollers 140, 142.

Referring to FIG. 4B it will be remembered that the entire fixture is cruciformed shaped. Therefore it is necessary for the vertical portion of the fixture to pass through the horizontal rollers 130, 132 and for the horizontal portion of the fixture to pass through the vertical rollers 140, 142.

To this end, there is supplied vertical gaps 150, 152 in horizontal rollers 130, 132 respectively and horizontal gaps (not shown) in the vertical rollers 140, 142. It can thus be seen that by utilizing cable 100 that the fixture can have the jig conveniently pulled therethrough.

Figure 4D:
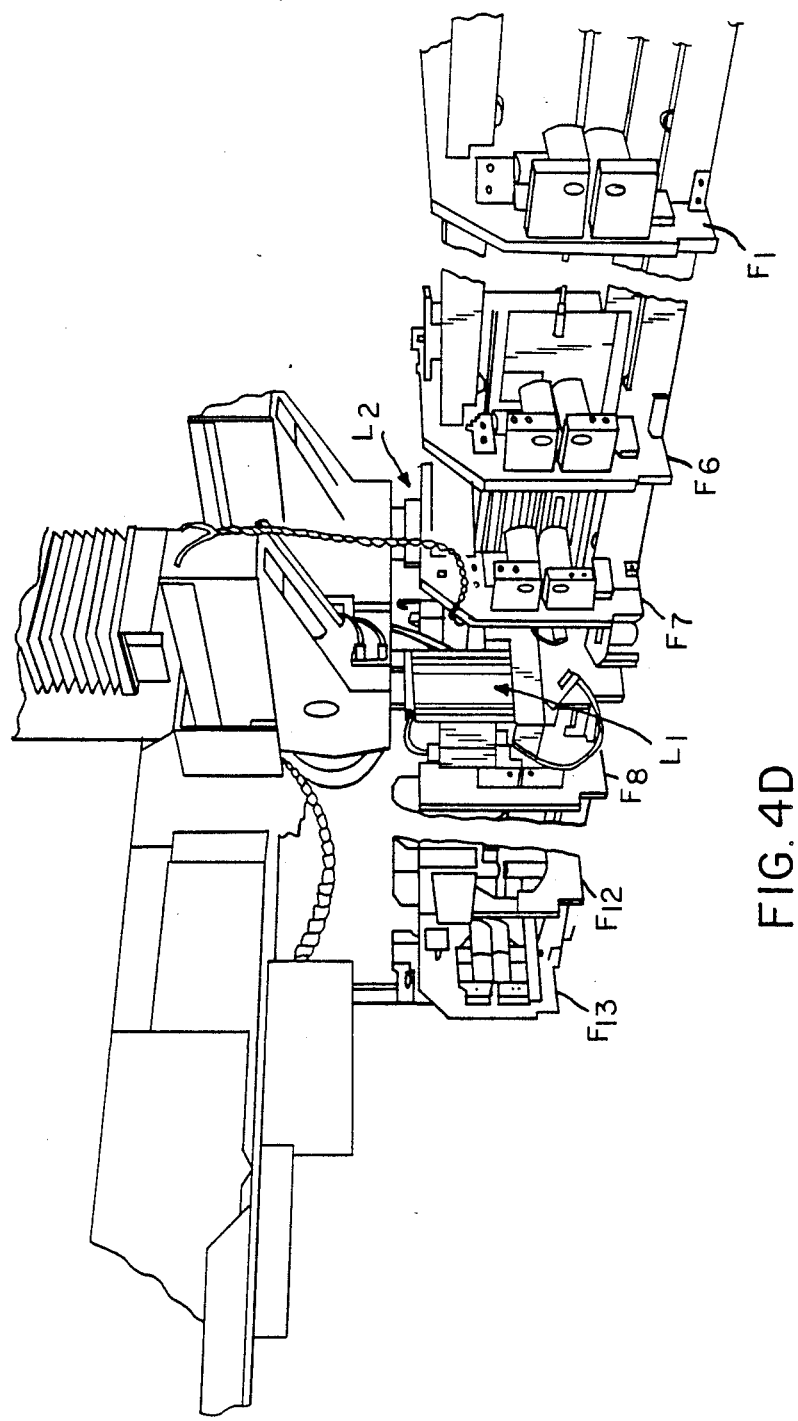
FIG. 4D is a perspective view of the jig of FIG. 4B being drawn through six fixtures illustrated in FIG. 4A past a welding apparatus for welding.

Referring to FIG. 4D, the welding apparatus of this invention can be understood. Specifically, cable 100 is shown pulling a jig, including leading member J1, through 13 fixtures F1-F13.

Located between seventh and eighth fixtures there are laser welders L1, L2. These respective laser welders follow the interface defined between the respective tubes T and affect the overall welding.

Both laser welding heads L1 and L2 are remotely guided. Such remote guiding can be fully understood in principle by referring to C. M. Penny et al. U.S. Pat. No. 4,465,917 issued Feb. 24, 1987.

Figure 4E:
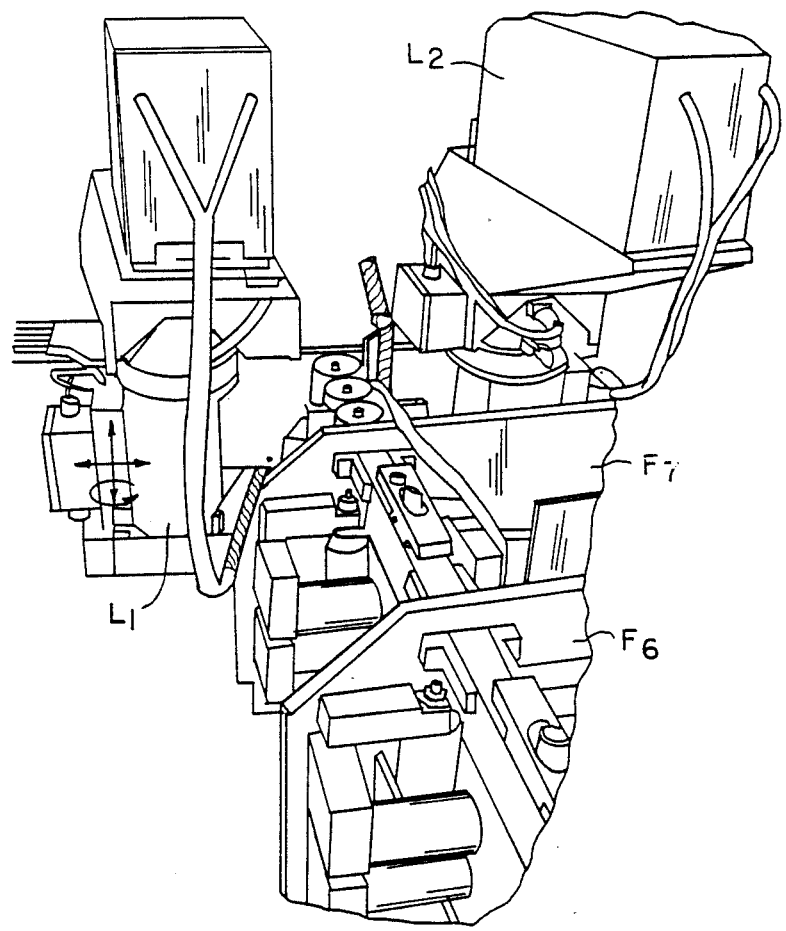
FIG. 4E is a perspective view of the laser welding apparatus utilized.

Referring to FIG. 4E, the laser units L1, L2 are illustrated. These units work on vertical surfaces of the tubes T and have an angle of incidence which is 5@ to the sides of the vertical surfaces. As can be seen, the laser units L1, L2 work on quadrants S1 and S3 of the control rod being fabricated. Because of the orientation of the lasers L1 and L2 welding is not performed on surfaces S2 and S4.

Referring to FIG. 4G, the rotation of the jig in combination with the fixtures F1-F13 can be understood. Specifically, and when the jig is pulled free and clear of the fixtures F1, F13, the jig can be rotated, usually in intervals of 90°. When it is rotated 90° as shown in FIG. 4G, sides S1 and S3 move from the vertical and sides S2 and S4 move to the vertical where they may be welded by the laser heads L1 and L2. Thus, it can be understood by rotations of jig members J1, J2, welding can occur on each of the planar surfaces of the control rod S1, S2, S3, and S4.

Referring to the detail of FIG. 5A, an additional aspect of this invention can be understood. Specifically, the individual tubes T of sides S1 and S3 are illustrated. They are shown compressing an intermediate tie rod segment 50 therebetween. As can be seen, the welding mechanism is provided with underlying rollers 201, 202 and 203. Likewise, there are overlying rollers 211, 212, and 213. These rollers are at the point of the laser welding heads L1, L2.

The purpose of these overlying and underlying rollers can be easily understood.

Typically, the rollers are placed under a commonly manifolded pneumatic pressure schematically illustrated by arrows 210 and 220. These respective vectors (formed by commonly manifolded pistons) compress the individual tubes T towards one another. Such compression makes absolutely certain that gaps between the respective tubes no longer exist. Should gaps be present, the high energy lasers necessary to effect the weld herein would pass through the gap and the weld would not occur.

Referring to FIG. 5B an additional detail is shown. Specifically, a tie rod piece 50 is shown braced by a brace piece 230. Brace piece 230 includes end pins 231-234. Paired brace pieces 230-234 trap a tie rod segment 50 therebetween. These respective brace pieces have four wheels 241, 242, 243 and 244 therebetween. These respective wheels hold the tie rod segment 50 plumb with the respective sides S1, S2, S3 and S4 as initial welding occurs.

The reader will understand that the individual tubes T are flexible. It has been found that the weldment from the laser weld when heated and thereafter cooled, shrinks. It is apparent, that unless careful sequence in the welding is developed, the ultimate produced control rod would not be straight.

Unfortunately, modern reactor technology requires linearity in all control rod constructions. Therefore it has been an important feature of the developed technology to disclose a welding sequence that assures this required linearity.

The basic strategy for maintaining linearity is to weld three square sectioned tubes together at one time. Typically, a middle square sectioned tube is welded at an upper corner to an overlying tube on one side and welded at a lower corner to an underlying tube on the opposite side.

Figure 6A:
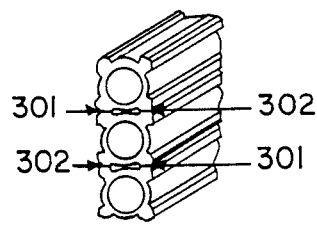
FIGS. 6A–6D are details of groups of square sectioned tubes with a preferred welding sequence numerically illustrated at juxtaposed side-by-side corners of the tubes.

Referring to FIG. 6A, tubes T are first welded into groups of three. Three tubes T are first welded together at weld 301. One weld 301 joins one side of the medial tube T to an overlying tube T. Simultaneously the other side of the medial tube T to tube 3. Then the alternate sides of the medial tube T are welded together as shown at welds 302 of the medial tube T.

Figure 6B:
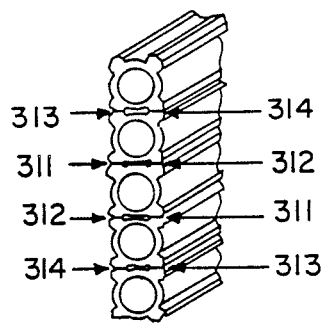
Figure 6C:
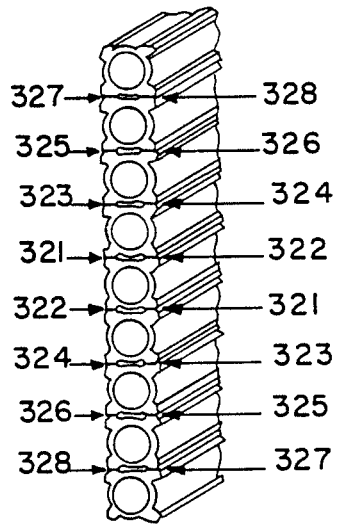

As the number of tubes T to be joined increases, the welding sequence continues. The continuation occurs in the numerical order designated by the numerals 311-314 in FIG. 6B for five tubes T and the numerical order designated by the numerals 321-328 in FIG. 6C.

It will be seen that the sequence illustrated preferably joins together tubes in odd number groups of 3, 5, and 9.

Figure 6D:
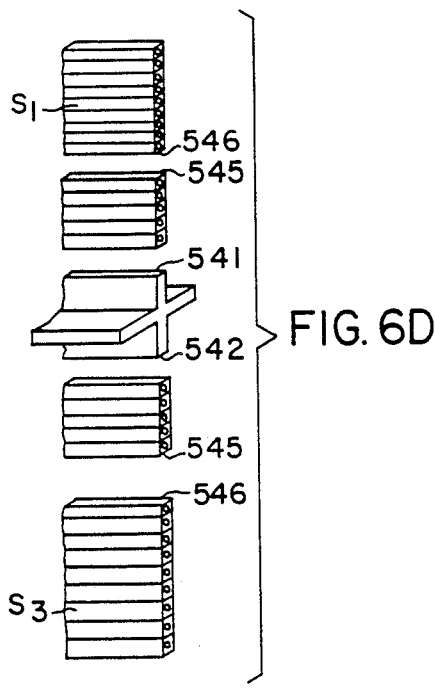

FIG. 6D shows the welding sequence for attaching the groups of tubes to the segmented tie rod. The first group of 5 tubes T is joined to the tie rod by weld 541 which welds both sides simultaneously. Then a similar group of tubes 5 is joined to the opposite side of the tie rod with welds 542.

The entire assembly is rotated 90°.

Thereafter welds join two more groups of 5 tubes to form a cruciform.

For a control rod with 14 tubes per side (56 total) groups of 9 tubes are then added. Welds 545 joins a group of 9 tubes to S1 on one side and joins a group of 9 tubes to S3 on the opposite side. Welds 546 then joins the alternate sides. The process is repeated for sides S2 and S4.

For a control rod with 17 tubes per sides (68 total), a group of three tubes is added by the same sequence, preferably between groups of five and nine tubes T.

Figure 7:
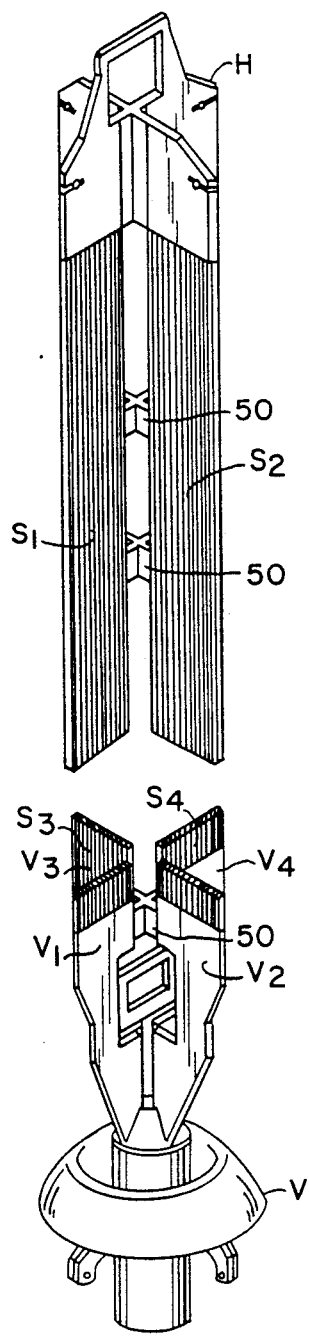
FIG. 7 is a cutaway perspective of the finished control rod product including the handle, velocity limiter and welded square exterior sectioned tubes therebetween.

Referring to FIG. 7, a completed control rod is illustrated. Specifically, a rod having intermittent tie rod segments 50 and sides S1, S2, S3 and S4 is illustrated.

Typically and fastened to the one end of the rod is a handle H. Fastened to the other end of the rod is a velocity limiter V. Velocity limiter V fastens by virtue of respective velocity limiter sides V1, V2, V3 and V4.

It can thus be seen that there has been disclosed a complete process and apparatus for the fabrication of the control rod from the square sectioned tubes. While this process will admit of modification, departure may be made by those having skill in the art.

It will be understood that the particular and elaborate process of manufacture arises because although individual tubes T can be extruded, a planar surface having the construction herein illustrated cannot be formed by extrusion. Moreover, it can be seen that the cylindrical areas of volumes supporting and containing the neutron absorbing poisons extend longitudinally of the tube. In such longitudinal extension and with an expanded volume, a control rod having higher worth and longer life is readily fabricated by the disclosed process.

I claim:

1. An apparatus for the assembly of a planar section of cruciformed shaped control rods from a plurality of tubes, each said tube having a cylindrical interior volume for the containment of neutron absorbing poisons and having a square external section for being joined in side-by-side relation to adjacent tubes, said apparatus including;

a jig for maintaining said rods in side-by-side relation, said jig including:
 a leading jig member;
 a trailing jig member;
 at least one stiffener therebetween for maintaining said leading and trailing jig member in spaced apart relation;
means for attaching said square exterior sectioned rods in fixed relation to said leading jig member;
means for supporting said rods to said trailing jig member:
laser welding apparatus said laser welding apparatus addressed to weld an interface between said square exterior sectioned tube;
at least first and second fixtures, said fixtures being disposed on either side of said laser welding apparatus;
each said fixture having opposed rollers for bracing said fixture and rods during passage therethrough to enable said rods to pass by said laser welding apparatus;
pulling means attached to said leading and trailing jig member, said pulling means to enable passage of said jig through said fixtures with said rods there attached to enable laser welding.

2. The invention of claim 1 and wherein said leading jig member is cruciformed shaped, said trailing jig member is cruciformed shaped, and said rods are disposed between said leading and trailing members in a cruciform shape.

3. The invention of claim 1 and wherein said fixtures each define first and second opposed rollers, said first opposed rollers being horizontally aligned and said second opposed rollers being vertically aligned;

each pair of opposed rollers defining a gap, said first horizontal opposed rollers defining a vertical gap and said second vertical opposed rollers defining a horizontal gap for permitting said jig having a cruciformed shaped welding rod to be pulled therebetween.

* * * * *